United States Patent [19]

Ford et al.

[11] Patent Number: 4,814,083

[45] Date of Patent: Mar. 21, 1989

[54] ALTERING PORE SIZE DISTRIBUTIONS

[75] Inventors: Douglas L. Ford, Eastwood; Richard D. Grant, Dundas, both of Australia

[73] Assignee: Memtec Limited, New South Wales, Australia

[21] Appl. No.: 935,312

[22] PCT Filed: Mar. 6, 1986

[86] PCT No.: PCT/AU86/00053

§ 371 Date: Oct. 28, 1986

§ 102(e) Date: Oct. 28, 1986

[87] PCT Pub. No.: WO86/05117

PCT Pub. Date: Sep. 12, 1986

[30] Foreign Application Priority Data

Mar. 6, 1985 [AU] Australia .................. PG9586

[51] Int. Cl.[4] ............................................. B01D 13/00
[52] U.S. Cl. ................... 210/490; 210/500.25; 210/500.28
[58] Field of Search ........... 210/639, 490, 505, 500.25, 210/500.28; 264/45.5, 41

[56] References Cited

U.S. PATENT DOCUMENTS

| | | |
|---|---|---|
| 2,714,568 | 3/1955 | Teichmann ................. 264/41 |
| 3,238,056 | 3/1966 | Pall et al. .................. 210/505 X |
| 3,331,772 | 7/1967 | Brownscombe et al. ... 210/500.25 X |
| 4,214,020 | 7/1980 | Ward et al. .................. 210/490 X |
| 4,239,714 | 12/1980 | Sparks et al. ............. 210/500.28 X |
| 4,473,476 | 9/1984 | McMillan ..................... 210/653 |
| 4,634,531 | 1/1987 | Nakagawa et al. ............ 210/639 |

FOREIGN PATENT DOCUMENTS

| | | |
|---|---|---|
| A0100552 | 2/1984 | European Pat. Off. . |
| A1593127 | 4/1981 | United Kingdom . |
| A2115425 | 9/1983 | United Kingdom . |

*Primary Examiner*—Frank Spear
*Attorney, Agent, or Firm*—Oblon, Fisher, Spivak, McClelland & Maier

[57] ABSTRACT

Pores that are smaller than or larger than a predetermined range of pore sizes in a porous membrane barrier are blocked with a controlled porosity blocking agent. The pores are first filled with a liquid so as to remove any air therein and then subjected to a transmembrane gas blow at a pressure which will clear the larger pores of the liquid. The larger gas filled pores or the smaller liquid filled pores are then blocked by a blocking agent using a polymer-forming chemical reaction, a precipitate-forming chemical reaction or the physical deposition of solids.

26 Claims, No Drawings

ALTERING PORE SIZE DISTRIBUTIONS

FIELD OF THE INVENTION

This invention relates to methods of altering pore size distributions of porous separating devices by placing controlled porosity blockages in unwanted sizes of pores or holes found in such devices.

The invention may be applied to a wide variety of porous separating devices such as porous membranes, tubes and hollow fibres which are used for microfiltration, ultrafiltration, dialysis, electrodialysis, diffusion, pervaporation, osmosis and reverse osmosis. For the sake of brevity, such devices shall be referred to as "porous barriers".

A variety of useful processes are based on separations made by selective permeation through relatively thin porous barriers. Many configurations and shapes of the surfaces of such porous barriers are used and the actual pore size distribution includes leaks and holes that may arise during the assembly of devices housing the barriers.

Although separation is not always determined by pore size alone, the presence of outlying pore sizes or unintended leaks is often detrimental and sometimes renders the barrier to be of little use. The inability to avoid pinholes or to plug them without plugging desired pores cause the rejection of a quantity of manufactured product and thus adds to cost. The preferred pore size distribution is always compromised by economic or uncontrollable factors.

The production of the pores in the barrier is often controlled by statistical factors affecting the aggregation of particles so that an undesirably wide range of pore sizes must be made. In a few cases it is the smaller pores which are undesirable. Complex pore size distributions eg: bimodal distributions which cannot be made directly, are also sometimes required.

Pore size distributions are often measured by the "bubble point" method of ASTM 316-70 (reapproved 1977) of the American Society of Testing Methods. The bubble point gives the pressure needed to move the first bubble of gas through the porous barrier when wetted with a liquid of known surface tension. The first bubble comes from the "largest" pore.

In a porous foam the first bubble comes from the pore exit of that transmembrane path, which possesses in cross section throughout its length, a greater ratio of corresponding surface to minimum perimeter than any other path. This precise understanding is vital to the analysis of pore size distributions and rates of fluid flow in the important case of open celled foams. The location of any bubble gas/liquid interface is seldom at the surface. Mostly it is at the most distorted point of a tortuous branching network of channels or at a leaks.

West German Pat. No. 3,312,729 describes accurate apparatus for bubble point measurement for pore sizes in the range from 0.001 to 10 microns.

BACKGROUND ART

East German Pat. No. 149,845 is the only known prior art which discloses the use the surface tension/pore size relationship to control the pore size of individual holes during pore formation. This is described in relation to single sided etching of radiation tracks in polymer foil. The pores of such a foil are not connected into a foam network; they form a simple sieve. The methods disclosed in the East German Patent allow all pore diameters to be regulated by the boundary surface tension between the etching agent and an inert medium. When the pore diameter has become so large that the pressure difference between these two is sufficient to expel the etching agent from the pore, etching ceases. In theory all the pores are the same size so that the pore size distribution is monodisperse, which is not always desired.

There is a need for a method which will find every incorrectly sized pore and then individually and specifically apply a versatile treatment to it.

The known prior art has no direct relevance to the methods and products of this invention which meet this unfilled need.

The present invention differs from known art in that there is no etching nor any step related to the initial production of the pores. Instead there is alteration of existing pore size distributions in an existing porous barrier. The function of the present invention is curative not preventative of undesirable pore sizes. Often this curative approach is advantageous.

DISCLOSURE OF THE INVENTION

The methods of this invention relate to controlled porosity blocking of unwanted upper or lower sizes of pores in porous barriers by using gas transbarrier pressure to clear upper sizes of pores of a wetting liquid and then arranging to block with a controlled porosity block either the liquid-filled small pores or the larger gas-filled pores. A polymer-forming or precipitate-forming chemical reaction or a physical deposition of solids may be used to form a controlled porosity block of the stability desired. The composition of the controlled porosity blocking agent is versatile and may be used to confer valuable new properties to the resultant porous barrier especially since the location of the controlled porosity blocks is specifically the same as the original bubble location. Thus the controlled porosity blocking agent seeks out the largest pores and partly or completely blocks them as desired. Larger leaks or even leaks which are just oversize can be eliminated or even turned to advantage.

Putting a correctly sized porous block into the oversized holes of a courser foam will give a greater flux than making the original foam with all holes below the desired size in most processes and furthermore will guarantee no leaks or rejects.

By temporarily blocking the larger gas-filled pores with a temporary blocking agent, eg: a gelatin or agar gel, then blowing out the next larger pores and blocking these permanently, then unblocking the temporarily blocked pores, using warm water to remove these gels, a bimodal pore size distribution is formed. More complex distributions are possible using these principles.

For many purposes it is desirable to make the "controlled porosity blockage" in the form of a substantially impermeable blockage. This avoids complicating the pore size distribution. The pores in any blockage are necessarily smaller than the original pores. Too many such pores, if very small, tend to make a microfilter into an ultrafilter in part, an unusual combination with only a few uses.

However, there is a special case where the "controlled porosity blockage" has pores which fall into the range of desirable sizes of the original barrier. This effect is very desirable since the over-large pores are then converted into more of the required sized pores.

The clarified liquid production rate is thereby increased over the rate when the same over-large pores are completely blocked. Examples of this effect are hereinafter described.

In carrying out the invention, the porous barrier is soaked in a non-volatile liquid to remove the air. The wet porous barrier is then subjected to transbarrier gas pressure until the first bubble appears on the opposite side. If the pore shape is assumed to be circular, the diameter of the hole is calculated from the formula:

$$D = 4S (\cos a)/P$$

where
- $D$ = hole diameter in centimeters
- $S$ = liquid surface tension in dynes/centimeter
- $a$ = liquid/pore wall contact angle (0 when it wets)
- $P$ = pressure in dynes/square centimeter hence $D = 4S/P$ when the walls are wetted.

For most practical purposes the assumption of circularity does not impede utility as experimental evidence is used to verify particle size rejection levels.

Smaller pores then begin to pass gas at increasingly higher pressures and although the method is limited to a pore size range, particularly when the pressures can distort or swell the pores, within these limits profiles of gas flows through the dry versus the wetted porous barrier can be used for the calculation of the pore size distribution, especially the "average hydrodynamic pore size".

In a preferred form of the invention there is provided a method of blocking unwanted pores in a porous membrane barrier which include the steps of:

(a) filling the pores completely with liquid, and
(b) blowing out the liquid from the large pore size range by using a gas pressure determined by standard bubble point calculations or practical experiment and then controlled porosity blocking either
(c) the gas-filled larger pores by forming controlled porosity blockages in them from liquids which are preferably immiscible with the liquid filling the smaller pores, or
(d) the liquid filled smaller pores, preferably by arranging that the filling liquid already constitutes or contains a controlled porosity pore-blocking component or contains a component which is further reacted to form the controlled porosity blockage, and
(e) finishing the chemistry of the controlled porosity blockage surfaces in any desired manner such as to lower adsorption or to effect electric charge changes or to improve physical or chemical properties of the whole barrier eg: crush resistance or wettability arising at least in part from the highly specific placing of the controlled porosity blockages and,
(f) continuing to apply the technique, using temporary blocking agents as needed, until the desired pore size distribution is obtained.

The wetting liquid may be hydrophilic, (preferably water) or hydrophobic, the composition being arranged to be compatible with any dissolved reactants without creating any difficulties. Examples of both types of liquid are described below.

EXAMPLES OF EMBODIMENTS OF THE INVENTION

The following examples illustrate the use of water as the wetting liquid (Method 1), and of a typical hydrophobic liquid (Method 2) in typical circumstances and describe the novel products made thereby.

All the examples started from a porous hollow fibre of polypropylene 50 cm long, 200 microns bore and 600 microns outside diameter whose pores ranged from an initial silicone oil bubble point of 140 kPa to an average pore of silicone oil bubble point of 444 kPa by ASTM 316-70. With the particular silicone oil liquid used 444 kPa corresponds to an average pore diameter of 0.21 microns.

METHOD 1

The fibres were potted at both ends into 18 guage stainless steel needles. The fibre was wetted with ethanol then water was passed through and the permeability to water was measured at 60 kPa transbarrier pressure (TBP) to give a flux. The bubble point in water was then measured. The fibre was removed from the water and held horizontally. Air was blown into the lumen to the required new bubble point for 30 seconds. The fibre was immediately immersed for 10 minutes in an ether solution of one of the following:

(a) 1% terephthaloyl chloride
(b) 10% terephthaloyl chloride
(c) 1% adipoyl chloride
(d) 2% sebacoyl chloride
(e) 1% resorcinol
(f) 1% resorcinol + 0.5% diethylene glycol
(g) 1% hexamethylenediisocyanate The fibre was rinsed for 30 seconds in ether, the ether evaporated at 25C. and then immersed for 10 minutes in an ether solution of a selected one of the following (where selection was made on chemically reactive grounds):

1. 5% N,N'-bis(3-aminopropyl)ethylenediamine
2. 10% N,N'-bis(3-aminopropyl)ethylenediamine
3. 2% Texaco Chemical "Jeffamine D-230", an alkoxide diamine
4. 2% Texaco Chemical "Jeffamine D-2000", a polyalkoxide diamine
5. 5% 1,6-diaminohexane
6. 3% 4,4'-diaminodiphenylmethane
7. 5% diethylenetriamine
8. 2% 1,4-phenylenediamine
9. 5% bis(3-aminopropyl)amine
10. 1:1 40% formaldehyde:10N HCl (no ether).

The treated fibre was well washed in ether then water and allowed to stand for at least 30 minutes before a new bubble point in water and water flux were determined.

The initial water bubble point, the desired rise in bubble point, the Method used, the treatment sequence with the above coded reagents, the bubble point achieved and the actual rise in bubble point are tabulated in Table 1:

TABLE I

DESIRED AND ACHIEVED RISE IN WATER BUBBLE POINTS

| Example No. | Bubble Point (kPa) | Blow to kPa up (Desired) | Method (M1) | Treatment | New Bubble Point (kPa) | Bubble Point Up kPa (Achieved) |
| --- | --- | --- | --- | --- | --- | --- |
| 1 | 280 | 20 | | (b) (2) | 440 | 160 |
| 2 | 280 | 20 | | (b) (2) | 400 | 120 |
| 3 | 295 | 20 | | (a) (2) | 320 | 25 |
| 4 | 270 | 20 | | " | 295 | 25 |
| 5 | 260 | 20 | | " | 295 | 35 |
| 6 | 275 | 20 | | " | 295 | 20 |
| 7 | 295 | 30 | | " | 320 | 25 |
| 8 | 270 | 30 | | " | 295 | 25 |
| 9 | 260 | 40 | | " | 320 | 60 |
| 10 | 275 | 60 | | " | 320 | 45 |
| 11 | 275 | 60 | | " | 330 | 55 |
| 12 | 270 | 70 | | " | 330 | 60 |
| 13 | 265 | 95 | Twice | " | 340 | 75 |
| 14 | 260 | 100 | Twice | " | 350 | 90 |
| 15 | 270 | 90 | Twice | " | 360 | 90 |
| 16 | 290 | 70 | Twice | " | 355 | 65 |
| 17 | 250 | 150 | Twice | " | 410 | 170 |

Example 17 showed a Flux of 180 1/m²/h water at 60 kPa, based on the inside diameter of the fibre.

CONCLUSION

Examples 3 to 17 show the bubble point desired was the bubble point achieved within the 5% measurement error. Examples 1 and 2 gave anomalous rises in bubble point due to excessive reagent concentrations.

Fibres from Examples 15–17 were combined and an ASTM 316-70 flow profile showed that the mean pore size had been reduced from 0.21 microns to 0.18 microns by Method 1.

Before treatment 50% of flow occurred through pores over 0.2 microns diameter but only 20% after treatment.

Before treatment 20% of flow was through pores over 0.3 microns diameter but only 1.1% after treatment.

The precision of the method with these unfavourable types of totally interconnected pores is impressive. The actual route of tortuous flow has been followed and the critical spaces in the largest flow routes have been blocked by deposits of controlled porosity, some of which give a balance of pore size control and permeation rate.

Method 1

Different Controlled Porosity Blocking Polymers

The success of Method 1 was extended by using a wide variety of controlled porosity blocking agents. The different controlled porosity blocking agents were found to confer useful new properties to the treated fibres. Greater strength came because so many tortuous pore channels had to be blocked to eliminate one large channel with this type of porous fibre. These polymeric blockers were almost impermeable compared to the microcrystalline blocking agents summarised later in Table 4 which are preferable if high flux is wanted. However, here Wettability was most desired and was rated: N=none, S=slight, M=moderate but useful, G=good. Wettability can be improved by the methods of the co-pending International Application No. PCT/AU84/00179.

TABLE II

VARIETY OF POLYMERIC CONTROLLED POROSITY BLOCKING AGENTS

| Ex. No. | Flux 60 kPa | Bubble Point (kPa) | Rise of kPa | (M1) Treatment | Flux Down 1/m²/h | Bubble Point Rise (kPa) | Wettability |
| --- | --- | --- | --- | --- | --- | --- | --- |
| 18 | 900 | 265 | 30 | (a), (3) | 690 | 35 | N |
| 19 | 1414 | 260 | 30 | (a), (3) | 1159 | 30 | N |
| 20 | 690 | 250 | 30 | (a), (4) | 495 | — | M |
| 21 | 750 | 250 | 30 | (a), (4) | 390 | 45 | M |
| 22 | 1080 | 260 | 30 | (a), (4) | 795 | 60 | M |
| 23 | 690 | 265 | 30 | (e), (10) | 240 | 55 | M |
| 24 | 660 | 255 | 30 | (e), (10) | 330 | 50 | M |
| 25 | 870 | 260 | 30 | (g), (1) | 690 | 55 | S |
| 26 | 1020 | 250 | 30 | (f), (10) | — | — | M |
| 27 | 471 | 250 | 30 | (f), (10) | 96 | 70 | M |
| 28 | 388 | 270 | 30 | (a), (9) | 238 | 30 | N |
| 29 | 810 | 260 | 30 | (a), (5) | 690 | 80 | N |
| 30 | 1050 | 250 | 30 | (a), (6) | 870 | 100 | N |
| 31 | 1080 | 250 | 30 | (a), (7) | 900 | 40 | N |
| 32 | 780 | 250 | 30 | (a), (8) | 630 | — | N |
| 33 | 675 | 255 | 30 | (c), (1) | 165 | 30 | N |
| 34 | 1020 | 250 | 30 | (d), (1) | 540 | 30 | N |

CONCLUSION

Again the desired bubble points (Column 4) and those achieved (Column 8) agree reasonably well, considering no attempt was made to optimize reagent concentrations over this wide range of controlled porosity blocking agents. Overall average bubble points rose 44 kPa whilst 34% average flux was retained.

METHOD 2

The general procedure of Method 1 was followed but this time the new bubble point was set using a hydrophobic liquid instead of water. The untreated fibres were soaked in 1.0% Jeffamine M-2005 of the Texaco Chemical Company in ether and dried to make them temporarily hydrophilic. The Flux in water at 60 kPa and water bubble point were measured. Then they were dried and soaked in petroleum spirit (b.p. 80–100C.) and the "petrol bubble point" determined. They were then blown out to the desired bubble point. A pressure rise of 30 kPa in petrol should correspond to a rise of 70 kPa in water. All treated fibres were found non wettable.

TABLE III
THE USE OF A HYDROPHOBIC LIQUID

| EX. NO. | FLUX WATER | BUBBLE POINT WATER | BUBBLE POINT PETROL | B.P. RISE (kPa) | METHOD (M2) | TREAT. CODE | FLUX DROP (l/m²/h) | BUBBLE POINT UP (kPa) |
|---|---|---|---|---|---|---|---|---|
| 35 | 420 | 270 | 110 | 30 | | (i), (11) | 210 | 10 |
| 36 | 405 | 260 | 115 | 25 | | (j), (12) | 285 | 55 |
| 37 | 690 | 255 | 105 | 35 | | (k), (12) | 420 | 50 |
| 38 | 540 | 270 | 110 | 30 | | (h), (a) | 330 | 10 |

CONCLUSION

A desired petrol bubble point of 30 kPa corresponds to a water bubble point of 70 kPa, correcting for surface tension. Method 2 is not as precise as Method 1.

TREATMENT CODE (h)=1% 1,4-phenylenediamine (aq.); (i)=1% polyvinyl alcohol (aq,); (j)=Melamine(2 g.)+formalin(5 ml)+Water(5 ml); (k)=urea-formaldehyde; (11) 5% hexamethylenediisocyanate in ether; (12)=5N HCl.

HOT STRENGTH AND ELASTICITY IMPROVEMENT

Two blank fibres were tested for the weight needed to stretch them at 80 C.in water to give 5% and 10% elongation. They were then relieved of the load and any failure of the elastic recovery was noted as a percentage of the original length.

Two similar fibres were treated with 1% resorcinol in ether, dried and then treated with a 1:1 mix of 40% formaldehyde and 10N hydrochloric acid. They were then tested in a comparison with the blanks.

| EX. NO. | TREATMENT | TEST | RESULT |
|---|---|---|---|
| 39 | Blank | Wt. for 5% stretch, | 9.4 g |
| | | then % elasticity | 2.5% |
| 40 | Blank | Wt. for 5% stretch, | 9.4 g |
| | | then % elasticity | 2.5% |
| 41 | Resorcinol | Wt. for 5% stretch, | 11.6 g |
| | | then % elasticity | 1.5% |
| 42 | Resorcinol | Wt. for 5% stretch, | 10.5 g |
| | | then % elasticity | 1.5% |
| 43 | Blank | Wt. to 10% stretch, | 11.6 g |
| | | Elastic return | 4.8% |
| 44 | Blank | Wt. to 10% stretch, | 11.6 g |
| | | Elastic return | 5.0% |
| 45 | Resorcinol | Wt. to 10% stretch, | 15.8 g |
| | | Elastic return | 3.5% |
| 46 | Resorcinol | Wt. to 10% stretch, | 16.7 g |
| | | Elastic return | 3.0% |

CONCLUSION

The resorcinol/formaldehyde treatment which had been used to block pores selectively also gave stronger fibres. They were also more elastic in their recovery after stretching.

CONTROLLED POROSITY BLOCKING AGENTS

It was found possible to achieve substantial raising of the bubble point without the comparatively large loss of flux previously obtained when reagents which deposit impermeable blockages were used. Examples using zirconium compounds are selected as illustrative of this microcrystalline controlled porosity blocking agent. Zirconyl phosphate illustrates a desirable resistance to hydrochloric acid and sodium hydroxide and hypochlorite used for cleaning and sterilizing but can be removed at will by hydrofluoric acid for retreatment or alteration if necessary. In general, similar precipitates are all suitable. There are many inorganic compounds which are insoluble in acids and alkalis but soluble in chelating agents or specific solutions in known manner. In some cases these can be obtained in the form of spheroids, eg: silicic acid. Also microspheres of polymers can be obtained in a full range of sizes to give a controlled porosity blockage. Preformed porous blocking agents are best held in place with low concentrations of polymeric blocking agents as used in Methods 1 and 2. The use of the preferred zirconium compounds is now disclosed.

The fibres were soaked in 2% Jeffamine M-2005 in acetone for 10 minutes and dried. The bubble point and flux in water were found and then dried for 12 hours. The bubble point in petroleum spirit was found. The air pressure was then raised to the new desired bubble point in petroleum spirit and the fibre at once plunged into the required zirconium solution for ten minutes. The fibre was then placed into the precipitating solution. The resultant treated fibre had the water bubble point and flux measured. From these results the summary of % Flux retention and Bubble point rise in water were calculated. These are tabulated in Table 4:

TABLE IV
REDUCED MAXIMUM PORE SIZE WITH CONTROLLED POROSITY BLOCKAGE GIVING HIGHER FLUX THAN IMPERMEABLE BLOCKAGE

| EX. NO. | TREATMENT | PERCENT FLUX RETAINED | RISE IN WATER BUBBLE POINT |
|---|---|---|---|
| 47 | (l), 12 | 37 | 65 kPa |
| 48 | (l), 12 | 16 | 135 |
| 49 | (m), 12 | 46 | 60 |
| 50 | (m), 12 | 18 | 145 |
| 51 | (n), 13 | 33 | 45 |
| 52 | (n), 13 | 40 | 100 |
| 53 | (n), 13 | 48 | 80 |
| 54 | (n), 13 | 29 | 95 |

(l) = 2% zirconium tetrachloride in water; (m) = 2% zirconium tetrachloride in 10 N sulphuric acid; (n) = 2% zirconyl chloride in water. (12) = 10% sodium hydroxide in water; (13) = 5% trisodium phosphate in water.

CONCLUSION

Comparison with Table II shows that the porous blockages give higher flux at the same rise in water bubble point. On average a high bubble point rise of 91 kPa (versus the 44 kPa of Table II) can be obtained with the same flux retention of 33 to 34%. This is a commercially significant advantage.

We claim:

1. A micro-porous membrane having an original pore size distribution in which at least some of the pores are larger than or at least some of the pores are smaller than a predetermined size or both and wherein the larger pores or the smaller pores or both are blocked by a blocking agent deposited in said pores, the blocking agent being deposited by a method which comprises applying a gas transmembrane pressure to the membrane to substantially clear upper sizes of pores of wetting liquid therein, and then applying a controlled porosity blocking agent to either the liquid-filled smaller pores or the larger gas-filled pores.

2. The membrane according to claim 1, wherein the porosity blocking agent is deposited in a controlled manner by a polymer-forming chemical reaction.

3. The membrane according to claim 1, wherein the porosity blocking agent is deposited in a controlled manner by a precipitate-forming chemical reaction.

4. The membrane according to claim 1, wherein the porosity blocking agent is deposited in a controlled manner by the physical deposition of solids.

5. The membrane according to claim 1, wherein the method of depositing the blocking agent further comprises temporarily blocking some of the larger holes, blowing and then blocking the remaining larger holes, and, unblocking the temporarily blocked holes.

6. The membrane according to claim 1, wherein the steps are repeated until a desired pore size distribution is obtained.

7. The membrane according to claim 1, wherein the liquid is hydrophilic.

8. The membrane according to claim 1, wherein the liquid is hydrophobic.

9. The membrane according to claim 1, wherein the blocking agent is selected from the group consisting of a zirconium compound, a polyamide, a urethane, a polyurethane, a urea, a polyurea, a melamine formaldehyde, and a phenol formaldehyde product.

10. The membrane according to claim 1, wherein the blocking agent is a reaction product of a compound selected from the group consisting of:
   (a) terephthaloyl chloride,
   (b) adipoyl chloride,
   (c) sebacoyl chloride,
   (d) resorcinol, and
   (e) hexamethylene diisocyanate
   with a compound, selected on chemnically reactive grounds, and being selected from the group consisting of:
   (f) N,N'-bis(3-aminopropyl)ethylenediamine,
   (g) an alkoxide diamine,
   (h) a polyalkoxide diamine,
   (i) 1,6-diaminohexane,
   (j) 4,4'-diaminodiphenylmethane,
   (k) diethylenetriamine,
   (l) 1,4-phenylenediamine,
   (m) bis(3-aminopropyl)amine, and
   (n) formaldehyde and an acid.

11. The membrane according to claim 1, wherein the blocking agent is a reaction product selected from the group consisting of:
   (a) polyvinylalcohol and hexamethylenediisocyanate,
   (b) melamine, formaldehyde and an acid,
   (c) urea-formaldehyde and an acid, and
   (d) terephthaloyl chloride and phenyldiamine.

12. A micro-porous membrane having an original pore size distribution in which at least some of the pores are larger than or at least some of the pores are smaller than a predetermined size or both and wherein the larger pores or the smaller pores or both are blocked by a blocking agent deposited in those pores, the blocking agent being deposited by a method comprising the steps of:
   (a) substantially filling the pores with a liquid, thereby substantially removing air therein,
   (b) subjecting the barrier to a transmembrane gas pressure at a pressure sufficient to substantially clear the larger pores of said liquid, and
   (c) blocking the gas-filled larger pores or the liquid-filled smaller pores in a controlled manner with a porosity blocking agent.

13. A method of selectively blocking pores in a porous membrane barrier, which are larger or smaller than pores of a pre-determined pore size range which are to remain unblocked, which comprises:
   (a) substantially clearing the pores which are larger than the pores which are to remain unblocked of a wetting liquid therein by applying a gas transmembrane pressure to said porous membrane, and then
   (b) blocking, in a controlled manner, either the liquid-filled smaller pores or the larger gas-filled pores with a porosity blocking agent.

14. A method of selectively blocking pores in a porous membrane barrier, which are larger than or smaller than pores of a pre-determined pore size range which are to remain unblocked, which comprises:
   (a) substantially filling the pores with a liquid, thereby removing air therein,
   (b) subjecting the barrier to a transmembrane gas pressure at a pressure sufficient to substantially clear the larger pores of said liquid, and
   (c) blocking the gas-filled larger pores or the liquid-filled smaller pores, in a controlled manner, with a porosity blocking agent.

15. The method according to claim 13 or claim 14, wherein the porosity blocking agent is provided in a controlled manner by a polymer-forming chemical reaction.

16. The method according to claim 13 or claim 14, wherein the porosity blocking agent is provided in a controlled manner by a precipitate-forming chemical reaction.

17. The method according to claim 13 or claim 14, wherein the porosity blocking agent is provided in a controlled manner by physical deposition of solids.

18. The method according to claim 13 or claim 14, which further comprises the steps of temporarily blocking some of the larger holes, blowing and then blocking the remaining larger holes, and unblocking the temporarily blocked holes.

19. The method according to claim 13 or claim 14, wherein the steps are repeated until a desired pore size distribution is obtained.

20. The method according to claim 13 or claim 14, wherein the liquid is hydrophilic.

21. The method according to claim 13 or claim 14, wherein the liquid is hydrophobic.

22. The method according to claim 13, wherein said gas transmembrane pressure is set by a bubble point determination.

23. The method according to claim 14, wherein the blocking agent is selected from the group consisting of a zirconium compound, a polyamide, a urethane, a polyurethane, a urea, a polyurea, a melamine formaldehyde, and a phenol formaldlehyde product.

24. The method according to claim 14, wherein the blocking agent is a reaction product of a compound selected from the group consisting of:
   (a) terephthaloyl chloride,
   (b) adipoyl chloride,
   (c) sebacoyl chloride, (d) resorcinol, and
(e) hexamethylene diisocyanate
with a compound, selected on chemically reactive grounds, and being selected from the group consisting of:
(f) N,N'-bis(3-aminopropyl)ethylenediamine,
(g) an alkoxide diamine,
(h) a polyalkoxide diamine,
(i) 1,6-diaminohexane,
(j) 4,4'-diaminodiphenylmethane,
(k) diethylenetriamine,
(l) 1,4-phenylenediamine,
(m) bis(3-aminopropyl)amine, and
(n) formaldehyde and an acid.

25. The method acocrding to claim 14, wherein the blocking agent is a reaction product selected from the group consisting of:
(a) polyvinylalcohol and hexamethylenediisocyanate,
(b) melamine, formaldehyde and an acid,
(c) urea-formaldehyde and an acid, and
(d) terephthaloyl chloride and phenyldiamine.

26. The method according to claim 14, wherein said gas transmembrane pressure is set by a bubble point determination.

* * * * *